US009225502B2

(12) United States Patent
Asplund et al.

(10) Patent No.: US 9,225,502 B2
(45) Date of Patent: Dec. 29, 2015

(54) METHOD AND NETWORK NODE FOR DETERMINING CHANNEL STATE INFORMATION IN AN UPCOMING TIME SLOT

(75) Inventors: Henrik Asplund, Stockholm (SE); David Astely, Bromma (SE); Jonas Fröberg Olsson, Ljungsbro (SE); Kjell Larsson, Lulea (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 269 days.

(21) Appl. No.: 14/009,075

(22) PCT Filed: Mar. 31, 2011

(86) PCT No.: PCT/EP2011/055015
§ 371 (c)(1),
(2), (4) Date: Sep. 30, 2013

(87) PCT Pub. No.: WO2012/130313
PCT Pub. Date: Oct. 4, 2012

(65) Prior Publication Data
US 2014/0226508 A1 Aug. 14, 2014

(51) Int. Cl.
H04W 4/00 (2009.01)
H04L 5/14 (2006.01)
(Continued)

(52) U.S. Cl.
CPC ............. H04L 5/1469 (2013.01); H04L 1/002 (2013.01); H04L 1/0026 (2013.01); H04L 43/50 (2013.01);
(Continued)

(58) Field of Classification Search
CPC ............. H04W 24/10; H04W 72/085; H04W 72/1231; H04W 72/1226; H04W 28/0231; H04L 1/002; H04L 1/0026; H04L 5/1469; H04L 43/50
See application file for complete search history.

(56) References Cited

U.S. PATENT DOCUMENTS 8,204,023 B2 * 6/2012 Kim et al. ............... 370/332
8,305,952 B2 * 11/2012 Youn et al. .............. 370/315
(Continued)

FOREIGN PATENT DOCUMENTS

CN 101341670 A 1/2009
CN 101933268 A 12/2010
WO 2006078498 A2 7/2006

OTHER PUBLICATIONS

LG Electronics "Multi-layered Rate Control for Uplink CoMP" 3GPP TSG RAN WG1 Meeting #58bis, R1-094179 ULMLRC, 3GPP Draft, 3rd Generation Partnership Project (3GPP), Mobile Competence Centre, Oct. 12, 2009, XP050388649, 9 pages.
(Continued)

Primary Examiner — Brian O'Connor
(74) Attorney, Agent, or Firm — Rothwell, Figg, Ernst & Manbeck, P.C.

(57) ABSTRACT

A method and a network node (110, 111) for determining first channel state information in an upcoming time slot for use by a first radio network node (111) when determining a set of radio transmission parameters for a transmission between the first radio network node (111) and a second radio network node (121) are provided. The net work node (110, 111) receives (201) second channel state information for said upcoming time slot. Furthermore, the network node (110, 111) determines (207) third channel state information for said upcoming time slot. The second and third channel state information are at least partly non-overlapping with each other. Next, the network node (110, 111) determines (208) the first channel state information, for said upcoming time slot, based on the second channel state information and the third channel state information.

12 Claims, 6 Drawing Sheets

(51) Int. Cl.

| | |
|---|---|
| *H04L 1/00* | (2006.01) |
| *H04W 72/12* | (2009.01) |
| *H04L 12/26* | (2006.01) |
| *H04W 24/10* | (2009.01) |
| *H04W 72/08* | (2009.01) |
| *H04W 28/18* | (2009.01) |
| *H04W 48/16* | (2009.01) |
| *H04W 72/00* | (2009.01) |

(52) U.S. Cl.
CPC .......... *H04W 72/1231* (2013.01); *H04W 24/10* (2013.01); *H04W 28/18* (2013.01); *H04W 48/16* (2013.01); *H04W 72/00* (2013.01); *H04W 72/085* (2013.01)

(56) References Cited

U.S. PATENT DOCUMENTS

| | | | |
|---|---|---|---|
| 8,442,069 B2* | 5/2013 | Ji et al. .......................... | 370/468 |
| 8,514,836 B2* | 8/2013 | Frenger et al. ................ | 370/349 |
| 8,774,037 B2* | 7/2014 | Kim et al. ..................... | 370/252 |
| 8,948,090 B2* | 2/2015 | Barbieri et al. ............... | 370/328 |
| 9,019,850 B2* | 4/2015 | Chen et al. .................... | 370/252 |
| 2007/0115909 A1 | 5/2007 | Wang et al. | |
| 2009/0122884 A1 | 5/2009 | Vook et al. | |
| 2012/0051257 A1* | 3/2012 | Kim et al. ..................... | 370/252 |
| 2012/0182944 A1* | 7/2012 | Sorrentino et al. ........... | 370/329 |
| 2012/0302172 A1* | 11/2012 | Falconetti et al. ........... | 455/67.11 |
| 2013/0235756 A1* | 9/2013 | Seo et al. ...................... | 370/252 |

OTHER PUBLICATIONS

LG Electronics "Multi-layered Rate Control for SIC-based coMP" 3GPP TSG RAN WG1 Meeting #58bis, R1-094178 DLMLRC, 3GPP Draft, 3rd Generation Partnership Project (3GPP), Mobile Competence Centre, Oct. 12, 2009, XP050388648, 9 pages.

Samsung "Inter-Cell Interference Mitigation Through Limited Coordination" 3GPP TSG RAN WG1 Meeting #54, R1-0082886, 3GPP Draft, 3rd Generation Partnership Project (3GPP), Mobile Competence Centre, Aug. 18, 2008, XP050316366, 9 pages.

Office Action issued by the State Intellectual Property Office of the People's Republic of China in corresponding application No. 201180069750.9, issued Sep. 3, 2014, 5 pages.

Search Report issued by the State Intellectual Property Office of the People's Republic of China in corresponding application No. 201180069750.9, issued Sep. 3, 2014, 2 pages.

* cited by examiner

METHOD AND NETWORK NODE FOR DETERMINING CHANNEL STATE INFORMATION IN AN UPCOMING TIME SLOT

CROSS REFERENCE TO RELATED APPLICATION(S)

This application is a 35 U.S.C. §371 National Phase Entry Application from PCT/EP2011/055015, filed Mar. 31, 2011, designating the United States, the disclosure of which is incorporated herein in its entirety by reference.

TECHNICAL FIELD

The present disclosure relates to the field of telecommunications. In particular, the present disclosure relates to a method for determining first channel state information in an upcoming time slot for use by a first radio network node and to a network node configured to determine first channel state information in an upcoming time slot for use by a first radio network node.

BACKGROUND

In a wireless communication system, a first and a second node communicate over a time-varying radio channel h(t) in alternating time slots on the same carrier frequency. In a given time slot, one of the nodes, such as the first node, may send a transmission over the time-varying radio channel. When the other node, such as the second node, receives the transmission, it may at the same time estimate radio channel characteristics of the time-varying radio channel. As an example, the estimated radio channel characteristics such as amplitude and phase may assist in demodulation of the transmission received by the second node. The estimated radio channel characteristics may be obtained by measurements on pilot symbols, transmitted by the first node. Such channel estimates, or estimated radio channel characteristics, represent one form of channel state information. Known methods utilizing channel state information include time- and frequency-dependent scheduling, link adaptation, pre-equalization, time reversal, interference cancellation, dirty paper coding and the like.

However, the accuracy of the channel state information, or channel estimates, will become obsolete with time. Furthermore, the first node cannot obtain a channel estimate before or during the actual transmission. Therefore, the accuracy of the channel estimate may degrade at a rate that is proportional to the speed at which the first and/or second node moves. Typically, the first node will report channel quality information (CQI), or channel quality indicator, during its transmit time slot. This information is, however, delayed, i.e. the information is not available to the second node until, for example, at a following time slot. Typically, the delay is longer than to the following slot not only due to estimation, coding and decoding delay, but also due to longer reporting period than one time slot, In the case of multi-antenna transmission, the channel quality information may comprise a rank indicator and a precoder matrix indicator (PMI). The channel quality information may be wide-band average or frequency-selective averages over smaller bandwidths. In some systems, as mentioned above, the channel quality information may comprise measures derived from channel estimates (causing information loss) to reduce signalling overhead, while in other systems the channel quality information may be sampled versions of the channel estimates.

In order to improve accuracy of the channel state information, it is known to configure the first node to employ so called channel prediction. Channel prediction may be that the first node observes the channel estimates, obtained using reported channel quality information during a time window [t0−T, t0] and uses this observed information to form an estimate of the channel at a future time instant t0+dt. Various methods for forming the estimate of the channel, including linear predictors or filters as well as model-based estimators, exist.

In many scenarios, known methods for estimation, or prediction, of channel state information are not sufficiently accurate. This may cause performance of the wireless communication system to degrade. Therefore, there is a need for an improved method for estimating channel state information.

SUMMARY

An object is to improve performance in a wireless communication system.

According to an aspect, the object may be achieved by a method for determining first channel state information in an upcoming time slot for use by a first radio network node when determining a set of radio transmission parameters for a transmission between the first radio network node and a second radio network node. The method comprises receiving second channel state information for said upcoming time slot. Moreover, the method comprises determining third channel state information for said upcoming time slot. The second and third channel state information are at least partly non-overlapping with each other. Furthermore, the method comprises determining the first channel state information, for said upcoming time slot, based on the second channel state information and the third channel state information.

According to an aspect, the object may be achieved by a network node for determining first channel state information in an upcoming time slot for use by a first radio network node when determining a set of radio transmission parameters for a transmission between the first radio network node and a second radio network node. The network node comprises a receiver configured to receive second channel state information for said upcoming time slot. Moreover, the network node further comprises a processing circuit configured to determine third channel state information for said upcoming time slot. The second and third channel state information are at least partly non-overlapping with each other. Furthermore, the processing circuit is configured to determine the first channel state information, for said upcoming time slot, based on the second channel state information and the third channel state information.

The network node, for example the first radio network node, receives the second channel state information from another network node, which is able to accurately determine the second channel state information. The second channel state information may be reports of channel quality information (CQI) that includes a prediction of conditions in a future time slot, it may be predicted channel estimates or predicted interference estimates or any kind of channel state information that the other network node is able to predict and/or measure. Moreover, the second channel state information may be pre-coding matrix, rank, prediction of upcoming transmissions and how these transmissions are configured, i.e. what scheduling parameters have been used. Scheduling parameters may be pre-coding matrix, rank, transport format and the like.

The network node determines third channel state information. The third channel state information may be predicted channel estimates or any kind of channel state information that that network node is able to predict. As an example, estimates of an uplink channel may include both transmission channels for the second radio network node and the channels for interfering links.

Next, the network node combines the determined and the received channel state information to generate the first channel state information. In this manner, the network node generates more accurate first channel state information thanks to the reception of second channel state information from another node, such as a user equipment, a radio base station or the like. With a more accurate first channel state information link adaptation or the like may be improved. As a result, the above mentioned object is achieved.

Hence, according to embodiments herein, the network node receives the second channel state information, predicted by another node. Next, the network node provides third channel state information, predicted by itself, i.e. the network node. Furthermore, the network node determines first channel state information by combining the second and third channel state information. In this manner, the network node cooperates with the further network node to provide predicted channel state information.

As an example, for Long Term Evolution (LTE) TDD downlink, where a network node, such as a radio base station, may only have partial channel information available from transmissions on the uplink. The partial channel information may, for example, be that the transmissions on the uplink are assigned to only parts of a total frequency band of a channel or to only some antennas. Hence, channel information is missing for parts of the frequency band or for some antennas. Therefore, the second channel state information, provided as feedback of the missing channel information, will enable the network node to make a decision regarding scheduling and link adaptation based on more information which otherwise would not have been available to the network node. At the same time, overhead cost of sending the second channel state information is less than for feedback of channel information for the total frequency band.

An advantage may be that the network node obtains channel state information which otherwise would not have been available to the network node.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
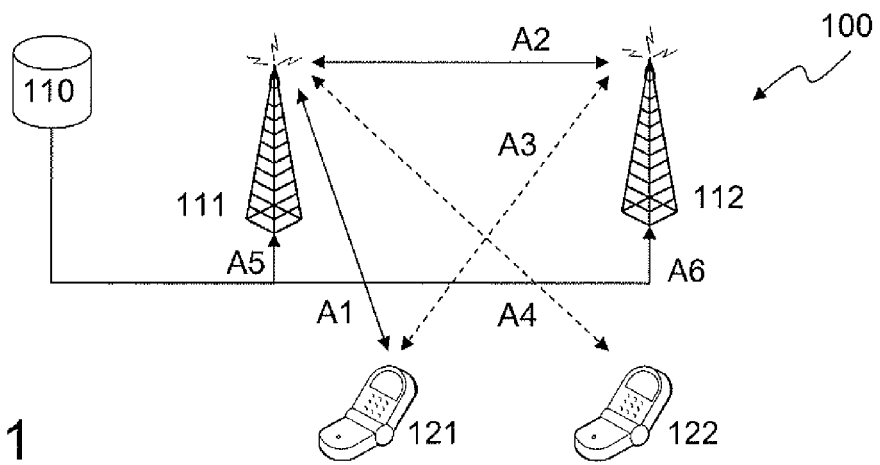
FIG. 1 shows a schematic overview of an exemplifying radio communication system in which exemplifying methods according embodiments herein may be implemented.

In order to better appreciate embodiments disclosed herein, a discussion regarding problems in prior art will be provided in the following.

In a radio communication system using Time Division Duplex (TDD) for communication, radio channel characteristics for a radio channel from a first node to a second node is identical to the radio channel characteristics for the radio channel in the opposite direction, i.e. from the second node to the first node. Sometimes the radio channel is said to be reciprocal, which thus means that the radio channel characteristics, or channel response, between the first and second node for the radio channel is independent of the direction of the communication over the radio channel. However, quality of the communication is not only dependent on the channel characteristics, but also on interference from other radio transmitters using the same radio resources, i.e. those radio resources used by nodes communicating over the radio channel.

In a typical cellular communication system, the interference is non-reciprocal. There are several reasons for this. For example, traffic characteristics are not equal between uplink and downlink, the radio interface at the first and second nodes may be designed differently to cater for differences between the capabilities of for example a user equipment and a base station, and downlink interferers are typically other base stations while uplink interferers are other user equipments. In other words, the transmission powers and spatial distributions of the uplink and downlink interferers are different.

Thus, it may be noted that channel prediction according to prior art at a transmitter, such as a radio base station, is not able to predict interference at a receiver.

In contrast to the transmitter, the receiver may predict the radio channel characteristics, i.e. channel response, and the interference at the receiver. However, information about the interference needs to be fed back by the receiver to the transmitter in order to be user by the transmitter in adapting the communication, such as a data transmission on the radio channel. A disadvantage with the information about the interference is that it will be slightly outdated when used in the adaptation of the communication.

In a radio communication system using Frequency Division Duplex (FFD), similar disadvantages occur.

In a radio communication system, utilizing multi-antenna transmission and reception, often referred to as Multiple Input Multiple Output (MIMO), the following scenario may be considered. A first node may employ a different number of antennas for transmission compared to reception. Typically, the number of transmit antennas constitute a subset of all available antennas. A second node, receiving a first transmission utilizing only a subset of all available antennas, may then only obtain partial channel state information by analyzing the first transmission received from the first node. The channel state information may be said to be partial in that the radio channel characteristics to or from the antennas not used by the transmission remains unknown. Thus, when the second node adapts a second transmission for sending to the first node, the second node is unable to take into account the radio channel characteristics to the antennas that were not used for the sending of the first transmission. To conclude, a disadvantage of the second node is that radio channel characteristics of antennas not used in the first transmission may not be taken into account when adapting the second transmission.

In another scenario, a first node transmits over only portions of the radio resources, or radio spectrum. As an example, only a portion of an available frequency band may be used by the first node for sending of a first transmission. A second node, receiving the first transmission, is then not able to estimate radio channel characteristics over the entire frequency band, or for all radio resources. Therefore, the second node is at a disadvantage when trying to adapt a second transmission for sending to the first node. In particular, this is a disadvantage when the second transmission requires a larger bandwidth, or more radio resources, than the first transmission, received from the first node. For a Long Term Evolution (LTE) system, a solution for overcoming this disadvantage has been proposed and implemented. Thus, a user equipment, as an example of the first node, transmits so called sounding reference symbols (SRSs) on the uplink to the radio base station, as an example of the second node. Thereby, the radio base station, such as an eNB or evolved-NodeB, is able to estimate the radio channel characteristics even if no data is transmitted in the uplink. However, the SRS occupy valuable radio resources, which otherwise may be used for transmission of data. Therefore, it is desired to keep the number of SRSs limited, e.g. as spaced in time as possible. This may be of particular importance for a user equipment handling, for example, a phone call, i.e. low data rates. For such a user equipment signalling overhead may be extensive if SRSs are sent too frequently.

In a further scenario, also relating to a LTE system, interference towards a first node from at least one further transmitter, such as an eNB, may vary quite fast. The interference may vary fast due to for example that the interference results from sporadic transmissions with small amounts of data. Furthermore, it may be difficult for the first node to predict the interference based on only Channel State Information (CSI) reports. This varying inter-cell interference is known to cause severe problems to the link adaptation performed by the first node.

Returning to the discussion about channel state information, the present inventors have noted that there exist many forms of channel state information. Another form of channel state information characterizes the data that is transmitted, its power level, modulation format etc. Similarly, the link between the two nodes is typically subject to interference from other concurrent communication links as well as to additive noise. The channel for the interfering link(s) as well as information about the data that is transmitted over the interfering link(s) constitute another form of channel state information.

Furthermore, another form of channel state information is scheduling state, which includes information when and how the data is transmitted. "When" means here scheduling information, i.e. to which time slots, or frames, users are scheduled. "How" means here information about how the information is transmitted, e.g. scheduled resources, pre-coding matrix used, beamforming weights. Together with channel(s) for interfering link(s) the total inference experienced may be determined.

Different kinds of channel state information for a particular link may be available at different locations in the network, e.g. a transmitting node knows the data that is transmitted but not the instantaneous channel, an interfering node knows when it is transmitting or not, while the receiving node may only be able to observe the resulting superposition of transmissions and interference. Channel state information that is available at the transmitter is generally used to optimize the transmission format.

Now proceeding with a description of embodiments and examples, in which description similar reference numerals have been used to denote similar elements, network nodes, parts, items or features, when applicable. In the Figures, features that appear in some embodiments are indicated by dashed lines.

FIG. 1 shows a schematic block diagram of an exemplifying communication system 100 in which embodiments and examples presented herein may be implemented. The communication system 100 may be a Long Term Evolution (LTE) system configured for operation in time division duplex (TDD) mode. In other examples, the communication system 100 may be configured for operation in FDD mode.

The communication system 100 may comprise a first radio network node 111, such as an eNodeB, user equipment or the like. In this example, the first radio network node 111 is a first radio base station, such as eNodeB or eNB.

The communication system 100 may comprise a second radio network node 121, such as an eNodeB, user equipment or the like. In this example, the second radio network node 121 is a first user equipment.

The communication system 100 may comprise a third radio network node 112, such as an eNodeB, user equipment or the like. In this example, the third radio network node 112 is a second radio base station, such as eNodeB or eNB. The communication system 100 may comprise a fourth radio network node 122, such as an eNodeB, user equipment or the like. In this example, the second radio network node 122 is a second user equipment.

The communication system 100 may comprise a further network node 110 configured to control the first and third radio network nodes 111, 112 as indicated by a fifth and a sixth arrow A5, A6. The further network node 110 may be a centralized eNB, an Operations and Maintenance entity (OAM) or the like.

A first arrow A1 indicates transmission between the first radio network node 111 and the second radio network node 121. The transmission may be channel state information, a channel quality indicator report, a predicted transmission report for some specified radio network node, information about sounding reference symbols or the like.

A second arrow A2 indicates transmission between the first radio network node 111 and the third radio network node 122. The transmission may be channel state information, a channel quality indicator report, a predicted transmission report for some specified radio network node, information about sounding reference symbols or the like A third arrow A3 indicates interference from the third radio network node 112 towards the first user equipment 121, or vice versa.

A fourth arrow A4 indicates interference from the second user equipment 122 towards the first radio network node 111, or vice versa.

The fifth arrow A5 indicates that the further network node 110 may send information to the first radio network node 111 for control thereof.

The sixth arrow A6 indicates that the further network node 110 may send information to the third radio network node 112 for control thereof.

As used herein, the term "user equipment" may denote a mobile phone, a cellular phone, a Personal Digital Assistant (PDA) equipped with radio communication capabilities, a smart phone, a laptop equipped with an internal or external mobile broadband modem, a portable electronic radio communication device or the like.

Figure 2:
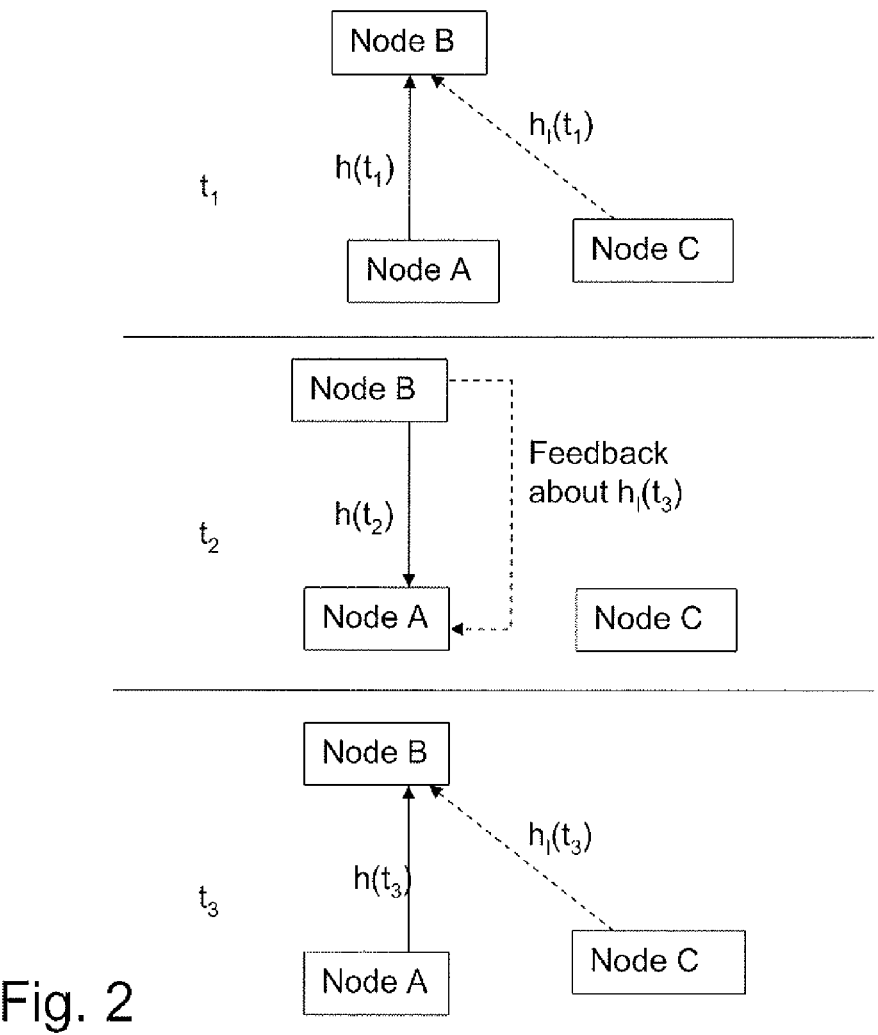
FIG. 2 shows an exemplifying, schematic block diagram illustrating an exemplifying scenario involving a first, a second and a third node.

In FIG. 2, there is shown three block diagrams over a first node Node_A, a second node Node_B and a third node Node_C during a first, a second and a third time slot, i.e. t1, t2 and t3, respectively. The time slots, or frames, may be consecutive. In other cases, the frames t1, t2 and t3 are non-consecutive, i.e. one or more frames (not shown) may pass between the three time slots shown in the Figure. In this scenario, the second node Node_B predicts the interference and provides information about the interference to the first node Node_A. The first node Node_A uses the information when sending a transmission on a downlink to the second node Node_B.

The first node Node_A may be an example of the first radio network node 111 of FIG. 1. The second node Node_B may be an example of the second radio network node 121 of FIG. 1, such as a user equipment. The third node Node_C may be an example of the third radio network node 112 of FIG. 1.

During the first time slot $t_1$, the second node Node_B generates a first estimate of the interfering channel $h_I(t1)$, where the interfering channel represents interference from the third node Node_C towards the second node Node_B. The first estimate and previous estimates of the interfering channel, i.e. $h_I(t<t1)$, is used by the second node Node_B for generation of a prediction of the interfering channel in the third time slot, i.e. $h_I(t_3)$. The prediction of the interfering channel in the third time slot may be referred to as a interference estimate $h_I(t_3)$.

During the second time slot $t_2$, the second node Node_B transmits data, as shown by the solid arrow, to the first node Node_A and provides feedback information about the interference estimate $h_I(t_3)$ as shown by the dashed arrow. The feedback information may be complex channel predictions, quantized information or indications of preferences for time slots, frequencies or other radio resources where it is predicted that interference will be less severe. Also during the second time slot $t_2$, the first node Node_A estimates the channel $h(t_2)$ based on the received data and forms a prediction $h(t_3)$ of the same channel. It may be noted that in this specific example transmission from the third node Node_C does not interfere with transmission from the second node Node_B to the first node Node_A during the second time slot $t_2$.

During the third time slot $t_3$, the first node Node_A utilizes both $h(t_3)$ and $h_I(t_3)$ when scheduling a transmission to the second node Node_B. As an example, the transmission may be scheduled on time slots or on frequencies where a signal to interference ratio, given by $|h|^2/|h_I|^2$, is increased, or sometimes even maximized. As another example, the transmission may be scheduled with a modulation and coding scheme (MCS) selected based on the predicted signal-to-interference-ratio (SIR).

In the downlink scenario illustrated above, the first node is able to predict the channel from uplink transmissions from the second node, and the second node is required to predict the interference. The second node may then feed back the predicted interference, e.g. the multi-antenna interference covariance matrix, to the first node which in turn can select e.g. an optimal MIMO precoder.

Figure 3:
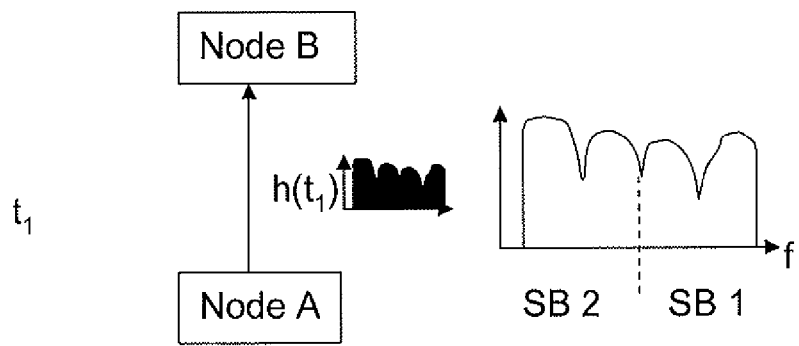
FIG. 3 shows another exemplifying, schematic block diagram illustrating another exemplifying scenario involving a first and a second node.
Figure 3:
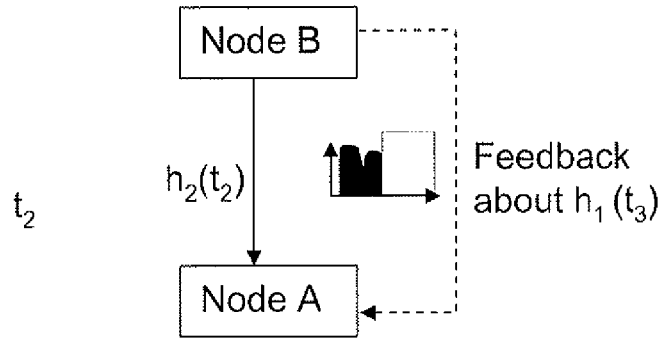
Figure 3:
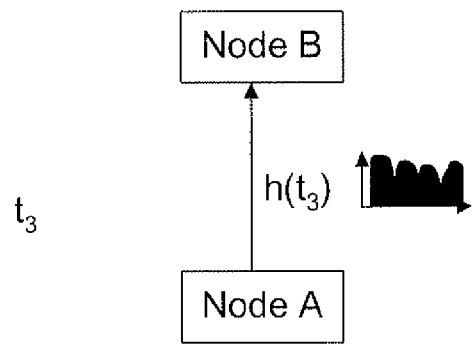
Figure 4:
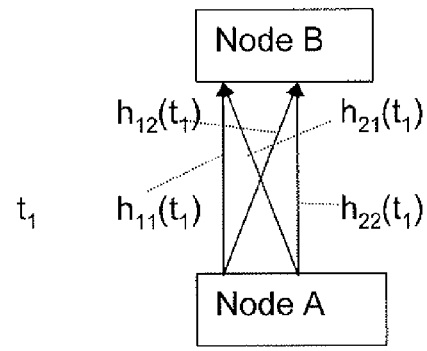
FIG. 4 shows yet another exemplifying, schematic block diagram illustrating yet another exemplifying scenario involving a first and a second node.
Figure 4:
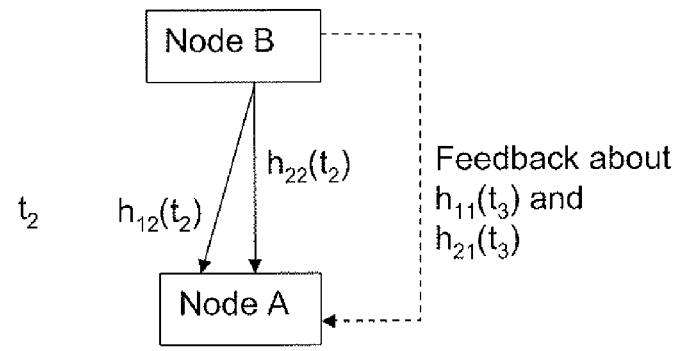
Figure 4:
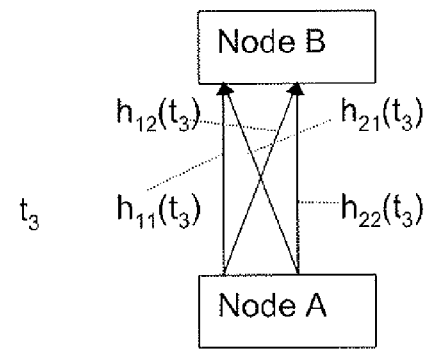

In FIG. 3 and FIG. 4, the first node Node_A has partial channel state information in that the channel response for portions of a frequency range of the channel between the first and second nodes Node_A, Node_B is known to the first node and in that the channel response for some antennas is known to the first node, respectively. In other examples, the first node Node_A may have partial channel state information in that the channel response for some time slots are known to the first node. To conclude, the first node may have partial channel state information in that the channel response is only known to the first node for some antennas, some time slots, some frequencies, or combinations thereof.

Now turning to FIG. 3, there are shown three exemplifying, schematic block diagrams over a first node Node_A and a second node Node_B during a first, a second and a third time slot, i.e. t1, t2 and t3, respectively. The time slots, or frames, may be consecutive. In other cases, the frames t1, t2 and t3 are non-consecutive, i.e. one or more frames (not shown) may pass between the three time slots shown in the Figure. In the scenario, illustrated with reference to FIG. 3, the first node Node_A has partial channel state information, or partial knowledge about the channel response, in that only portions of the channel h(t) is utilized for transmission to the first node during the second time slot $t_2$. Expressed differently, the transmission from the second node Node_B to the first node Node_A only occupies a portion of the available bandwidth of the channel.

Again, the first node Node_A may be an example of the first radio network node 111 of FIG. 1. And again, the second node Node_B may be an example of the second radio network node 121 of FIG. 1, such as a user equipment.

During the first time slot $t_1$, the second node Node_B estimates the channel response $h(t_1)$ over a full bandwidth based on a transmission transmitted from the first node Node_A, as shown by the solid arrow. The full bandwidth, or total bandwidth, includes a first sub-band SB1 and a second sub-band SB2. Moreover, the second node Node_B generates an estimate of the channel response $h_I(t_3)$ over the first sub-band SB1, where the estimate is predicted for the third time slot $t_3$.

During the second time slot $t_2$, the second node Node_B transmits a transmission of data to the first node Node_A using only the second sub-band SB2 and provides feedback information about the channel response $h_I(t_3)$ for the first sub-band SB1. The first node Node_A uses the transmission of data and control information, pertaining to the transmission of data, to estimate the channel response for the second sub-band SB2 during the second time slot. The first node Node_A also generates a prediction of the channel $h_2(t_3)$ for the second sub-band SB2 based on the channel response for the second sub-band SB2 during the second time slot and possibly additional information.

During the third time slot $t_3$, the first node Node_A may combine the two predictions of the channel responses $h_I(t_3)$, $h_2(t_3)$ for the first and second sub-bands SB1, SB2 in order to generate a predicted channel response over the full bandwidth for the third time slot $h(t_3)$. When scheduling a transmission in the third time slot, the first node Node_A may take the predicted channel response over the full bandwidth $h(t_3)$ into account.

With reference to FIG. 4, there is shown three exemplifying, schematic block diagrams over a first node Node_A and a second node Node_B during a first, a second and a third time slot, i.e. t1, t2 and t3, respectively. The time slots, or frames, may be consecutive. In other cases, the frames t1, t2 and t3 are non-consecutive, i.e. one or more frames (not shown) may pass between the three time slots shown in the Figure. In the scenario, illustrated with reference to FIG. 4, the first node Node_A has partial channel state information, or partial knowledge about the channel response, in that only some antenna or antennas is/are utilized for transmission to the first node during the second time slot $t_2$. Expressed differently, the transmission from the second node Node_B to the first node Node_A only occupies a portion of the antennas available to the channel. $h_{11}(t)$ denotes a first channel response between a first antenna of the first node Node_A and a first antenna of the second node Node_B at a time slot t. $h_{12}(t)$ denotes a second channel response between a first antenna of the first node Node_A and a second antenna of the second node Node_B at a time slot t. $h_{21}(t)$ denotes a third channel response between a second antenna of the first node Node_A and a first antenna of the second node Node_B at a time slot t. $h_{22}(t)$ denotes a fourth channel response between a second antenna of the first node Node_A and a second antenna of the second node Node_B at a time slot t. The time slot may be the first, second or third time slot $t_1$, $t_2$ and $t_3$.

Again, the first node Node_A may be an example of the first radio network node 111 of FIG. 1. And again, the second node Node_B may be an example of the second radio network node 121 of FIG. 1, such as a user equipment.

During the first time slot $t_1$, the second node Node_B estimates the channel response $h(t_1)$ between all antennas of the respective node based on a transmission transmitted from the first node Node_A, as shown by the solid arrows. Moreover, the second node Node_B generates predictions of the first channel response $h_{11}(t_3)$ and the third channel response $h_{21}(t_3)$ for the third time slot $t_3$.

During the second time slot $t_2$, the second node Node_B transmits a transmission of data to the first node Node_A using only the second antenna of the second node Node_B and provides feedback information about the first and third channel responses $h_{11}(t_3)$, $h_{21}(t_3)$. The first node Node_A uses the transmission of data and control information, pertaining to the transmission of data, to estimate the second and fourth channel responses during the second time slot $t_2$. The first node Node_A also generates a prediction of the second channel response $h_{12}(t_3)$ and the fourth channel response $h_{22}(t_3)$.

During the third time slot $t_3$, the first node Node_A may combine the four predictions of the first, second, third and fourth channel responses $h_{11}(t_3)$, $h_{12}(t_3)$, $h_{21}(t_3)$, $h_{22}(t_3)$ in order to generate a predicted channel response for all antennas for the third time slot $h(t_3)$. When scheduling a transmission in the third time slot, the first node Node_A may take the predicted channel response for all antennas $h(t_3)$ into account.

Figure 5:
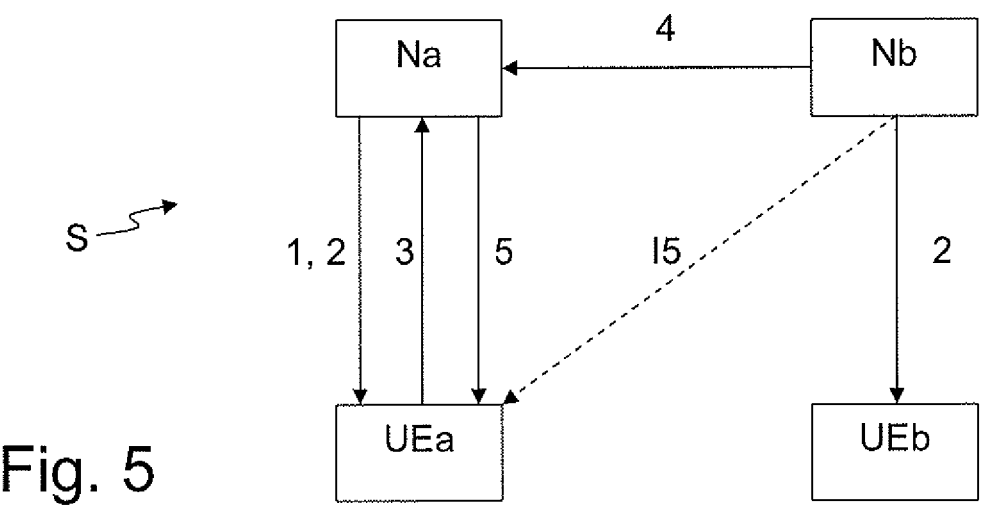
FIG. 5 shows an exemplifying, schematic block diagram over a cellular radio communication system illustrating a downlink scenario.

Referring to FIG. 5, there is illustrated a further exemplifying, schematic block diagram over a cellular mobile communication system S, comprising a first node Na, a second node Nb, a first user equipment UEa and a second user equipment UEb. The first node Na may be an example of the first radio network node 111 of FIG. 1. The second node Nb may be an example of the third radio network node 112 of FIG. 1. The first user equipment UEa may be an example of the second radio network node 121 of FIG. 1. The second user equipment UEb may be an example of the fourth radio network node 122 of FIG. 1. The first and second nodes Na, Nb may transmit data to the user equipments UEa, UEb, respectively. Expressed differently, the first and second user equipments UEa, UEb are served by the first and second nodes Na, Nb, respectively. When the first node Na is transmitting to the first user equipment UEa, the transmission is interfered by the second node's Nb transmission to the second user equipment UEb. Similarly, when the second node is transmitting to the second user equipment UEb, the transmission is interfered by the first node's Na transmission to the first user equipment UEa. Thus, the scenario illustrated in FIG. 5 relates to adaptation of a downlink transmission from the first network node Na to the first user equipment UEa. This is similar to what is indicated by the third and fourth arrows A3, A4 of FIG. 1. Typically, the first node Na is selecting a transport format, e.g., rank, pre-coder, modulation and coding scheme, based on CSI (Channel State Information) reported by the first user equipment UEa. The reported CSI may in certain scenarios be very in-accurate due to fluctuating interference from surrounding nodes, i.e. the second node Nb in the scenario of FIG. 5. The fluctuations may be caused by so called chatty applications and may be very difficult to predict by the first node Na based on only the reported CSI. A chatty application may be an application infrequently, or in a sporadic manner, transmitting small amounts of data, such as an e-mail application checking an e-mail server for new e-mails. Although the interference caused by the transmissions made by the second node Nb is difficult for the first node Na to predict, it does not mean that the transmissions from the second node Nb are unpredictable. It may happen that the second node Nb itself can make good predictions of its transmissions. As an example, the first and second nodes Na Nb may have some pre-agreed transmission scheme which is intended to reduce inference between the respective transmissions. The prediction made by the second node Nb about its future transmissions may be forwarded to the first node Na which utilizes the information in the link adaptation, such as selection of scheduling parameters like transport format, modulation and coding scheme, resource blocks and the like.

The following actions, such as steps, may be performed. Notably, in some embodiments of the method the order of the actions may differ from what is indicated below.

1. The first node Na configures the first user equipment UEa to report CSI information, which may include channel variations and interference variations with respect to the first node Na. This is known in the art.
2. The first node Na configures the first user equipment UEa to report information about interference from surrounding cells, such as the second node Na. The information may include one or more of:
    a. RSRP measurement reports, and
    b. CSI reports relative to the second node Nb. As an example, the second node Nb may inform the first node Na about its, i.e. the second node's Nb, CSI-RS (CSI reference symbol) configuration and the first node Na may instruct, using higher layer signalling, the first user equipment UEa to send a CSI report relative to the second node Nb.
3. According to the configuration actions 1 and 2 directly above, the first user equipment UEa reports CSI information and information about interference from surrounding cells to the first node Na.
4. The second node Nb transmits a transmission prediction report to the first node Na with a prediction of the second node's Nb upcoming transmissions, which possibly may interfere with a downlink transmission to be sent to the first user equipment UEa in an upcoming time slot.
5. The first node Na predicts channel variations based on the information about interference and uses the transmission prediction report and the CSI information to predict a resulting signal-to-interference-and-noise-ratio (SINR). Next, the first node Na adapts the transmission to the first user equipment UEa while taking the resulting SINR into account. The adaptation of the transmission to the first user equipment UEa may be performed by selecting parameters for scheduling while taking the resulting SINR into account.

Figure 6:
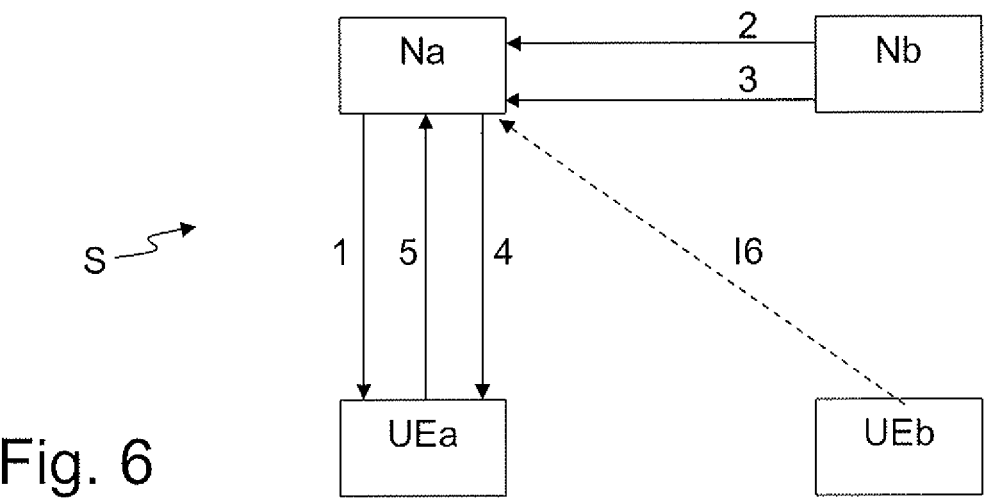
FIG. 6 shows an exemplifying, schematic block diagram over a cellular radio communication system illustrating an uplink scenario.

FIG. 6 shows yet another exemplifying, schematic block diagram over the cellular mobile communication system S, which also is shown in FIG. 5. When the first user equipment UEa is transmitting to the first node Na, the transmission is interfered by the second user equipment's UEb transmission to the second node Nb. Similarly, when the second user equipment Nb is transmitting to the second node Nb, the transmission is interfered by the first user equipment's UEa transmission to the first node Na. This is similar to what is indicated by the third and fourth arrows A3, A4 of FIG. 1. Thus, the scenario illustrated in FIG. 6 relates to adaptation of an uplink transmission from the first user equipment UEa to the first network node Na.

The following actions, such as steps, may be performed. Notably, in some embodiments of the method the order of the actions may differ from what is indicated below.

1. The first node Na configures the first user equipment UEa to transmit Sounding Reference Symbols (SRS) which are typically used to estimate channel and interference. This is known in the art.
2. The second node Nb informs the first node Na about its SRS configuration, power control configuration and possibly periodic updates power headroom reports, i.e. for the second user equipment UEb served by the second node Nb. The first node Na uses the SRS transmissions from the second user equipment UEb to obtain information about the interference caused by the second user equipment UEb, or more generally caused by each one of the user equipments served by the second node Nb. When the first node Na has been informed about the transmit power and the path loss of the second user equipment UEb, the first node Na may decode and filter out the channel of the second user equipment UEb. Furthermore, the first node Na may have been informed about power control configuration for the SRS, data part, such as PUSCH, and power headroom report. The information sent by the second node Nb to the first node Na is precisely the information that Nb uses for estimating the channel state information from the second user equipment UEb to the second node Nb. By forwarding this information to the first node Na, the first node Na is able to estimate the channel from the second user equipment UEb to the first node Na.
3. The second node Nb transmits a transmission prediction report to the first node Na with a prediction of the second user equipment's UEb upcoming transmissions, which possibly may interfere with an uplink transmission in an upcoming time slot.
4. The first node Na predicts channel variations based on received SRS from the second user equipment UEb and uses the transmission prediction report and measurements on SRS from the first user equipment UEa to predict a resulting SINR. Next, the first node Na schedules an uplink transmission from the first user equipment UEa while taking the resulting SINR into account. In this manner, the first node Na performs link adaptation and schedules the uplink transmission accordingly.
5. The first user equipment UEa transmits the uplink transmission as scheduled by the first node Na.

Figure 7:
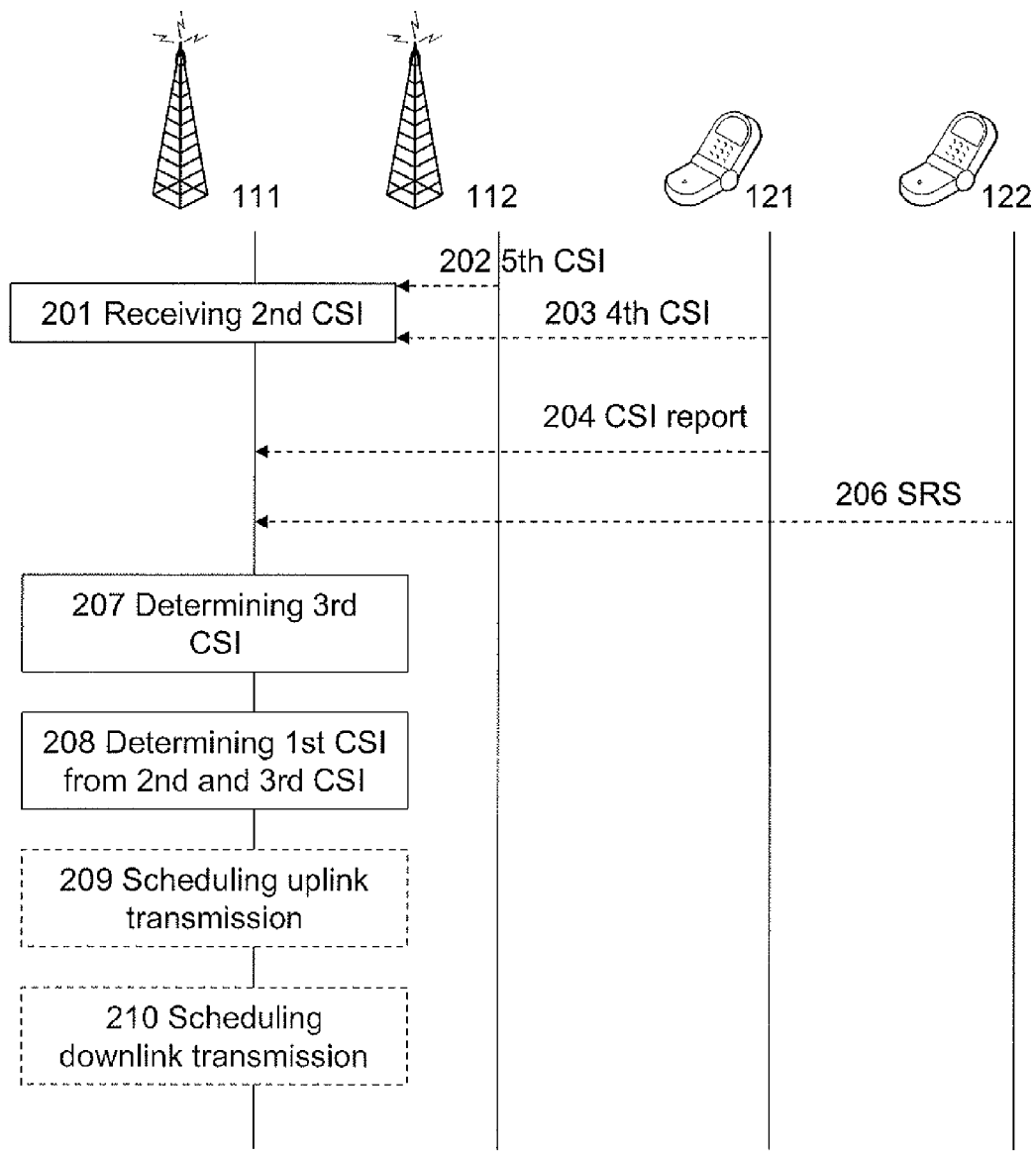
FIG. 7 shows a schematic, combined signalling and flow chart of exemplifying methods in the radio communication system according to FIG. 1.

FIG. 7 shows a schematic, combined signalling and flow chart of exemplifying methods in the radio communication system according to FIG. 1. In FIG. 7, there is presented a method for determining first channel state information in an upcoming time slot for use by a first radio network node 111 when determining a set of radio transmission parameters for a transmission between the first radio network node 111 and a second radio network node 121. As an example, the set of radio transmission parameters may be used for link adaptation when scheduling the transmission. As another example, the set of radio transmission parameters may be parameters for selection of parameters specifying a transport format to be used for the transmission to be scheduled in the upcoming time slot.

In some embodiments of the method, the method is performed by the first radio network node 111 or a further network node 110 controlling the first and/or third radio network node 111, 112.

The following actions, such as steps, may be performed. Notably, in some embodiments of the method the order of the actions may differ from what is indicated below.

Action 201

The network node 110, 111 receives second channel state information for said upcoming time slot. This action is similar to actions performed by the first node Node_A during the second time slot as shown in FIGS. 2, 3 and 4. Moreover, this action is similar to action denoted by reference numeral 4 in FIG. 5 and action denoted by reference numeral 3 in FIG. 6.

As an example relating to the downlink of an LTE system, the second channel state information may comprise a report of CSI, such as a RI/CQI report. Moreover, the second channel state information may comprise a report determined by the first user equipment by evaluating signals, such as CSI reference symbols, or reference symbols, received from surrounding cells, such as the third radio network node. Furthermore, the second channel state information may comprise CSI, such as scheduling information, from surrounding cells, such as the third radio network node.

As an example relating to the uplink of an LTE system, the second channel state information may be CSI, such as scheduling information from surrounding cells, such as the third radio network node.

In some embodiments of the method, the second channel state information comprises fourth channel state information received 203 from and sent by the second radio network node 121. This is similar to actions during the second time slot as shown in FIGS. 2, 3 and 4. As an example, the fourth channel state information may be feedback information about the interference estimate $h_I(t_3)$, about the channel response $h_1(t_3)$ for the first sub-band SB1 and/or about the third and fourth channel responses $h_{21}(t_3)$, $h_{22}(t_3)$.

In some embodiments of the method, the fourth channel state information is indicative of channel state for a first frequency range SB1. These embodiments relate to the example of FIG. 3.

In some embodiments of the method, the fourth channel state information is indicative of channel state for a first antenna. These embodiments relate to the example of FIG. 4.

In some embodiments of the method, the second channel state information comprises a report of predicted transmission. The report may be received 202 from a third radio network node 112. These embodiments relate to the examples of FIGS. 5 and 6. As an example, the report of predicted transmission may be a transmission prediction report.

In some embodiments of the method, the report of predicted transmission comprises information about transmission, predicted for the upcoming time slot, from the third radio network node 112 to a fourth radio network node 122, the fourth radio network node 122 is served by the third radio network node 112. These embodiments relate to the example of FIG. 5, in which a downlink scenario is illustrated.

In some embodiments of the method, the report of predicted transmission comprises information about transmission, predicted for the upcoming time slot, from a fourth radio network node 122 to the first radio network node 111, the fourth radio network node 122 is served by the third radio network node 112. These embodiments relate to the example of FIG. 6, in which an uplink scenario is illustrated.

Action 207

The network node 110, 111 determines third channel state information for said upcoming time slot, the second and third channel state information are at least partly non-overlapping with each other. This action is similar to actions performed by the first node Node_A during the second time slot as shown in FIGS. 2, 3 and 4. Moreover, this action is similar to action denoted by reference numeral 5 in FIG. 5 and action denoted by reference numeral 4 in FIG. 6.

In some embodiments of the method, the second and third channel state information are at least partly non-overlapping with each other in that the second and third channel state information relates to different frequency ranges, to different antennas and/or to sending of a signal interfering with the transmission and the transmission, respectively.

In some embodiments of the method, the determining 207 of the third channel state information is based on a channel state report, such as a CQI report, received 204 from the second radio network node 121. These embodiments relate to the example of FIG. 5. The third channel state information is similar to the CSI information and information about interference from surrounding cells mentioned in conjunction with reference numeral 3 in the description of FIG. 5.

In some embodiments of the method, the network node 110, 111 determines the third channel state information in that the network node 110, 111 uses channel estimates based on signals, such as SRSs, received in a preceding uplink time slot. As an example, the network node 110, 111 determines the third channel state information based on measurements performed in the network node 110, 111, such as channel estimates for the channel from the second radio network node to the first radio network node.

As an example relating to the downlink of an LTE system, the determining of the third channel state information may comprise calculating resulting interference from reported CSI for interference, e.g. interference from the third radio network node towards the second radio network node, and CSI for scheduling information, e.g. reported to the first radio network node from the third radio network node.

As an example relating to the uplink of an LTE system, the determining of the third channel state information may be estimation of uplink channel and interference resulting from channel estimates based on SRS or similar, e.g. SRSs transmitted by the fourth radio network node and received by the first radio network node, and scheduling information, e.g. reported from the third radio network node.

In some embodiments of the method, the channel state report comprises information about channel state for a second frequency range SB2. At least a portion of the second frequency range SB2 is non-overlapping with the first frequency range SB1. As an example, the information about channel state for a second frequency range SB2 may be a prediction of the channel $h_2(t_3)$.

In some embodiments of the method, the channel state report comprises information about channel state for a second antenna, the second antenna is different from the first antenna. As an example, the information about channel state for the second antenna may be the second channel response $h_{12}(t_3)$ and the fourth channel response $h_{22}(t_3)$.

In some embodiments of the method, the determining 207 of the third channel state information further is based on the report of predicted transmission. These embodiments relate to the examples of FIGS. 5 and 6.

In some embodiments of the method, the determining 207 of the third channel state information is based on reference symbols, SRS, received 206 from the fourth radio network node 122. These embodiments relate to the example of FIG. 6.

Action 208

The network node 110, 111 determines the first channel state information, for said upcoming time slot, based on the second channel state information and the third channel state information. This is similar to action performed during the third time slot as described in conjunction with FIGS. 2, 3 and 4. This is also similar to action denoted by reference numeral 5 of FIG. 5 and to action denoted by reference numeral 4 of FIG. 6. As an example, the first channel state information may be the resulting SINR of action denoted by reference numeral 5 of FIG. 5.

Action 209

In some embodiments of the method, the transmission is an uplink transmission from the second radio network node 121 to the first radio network node 111. The network node 110, 111 may further schedule the uplink transmission for said upcoming time slot while taking the first channel state information into account. These embodiments relate to the example of FIG. 6.

Action 210

In some embodiments of the method, the transmission is a downlink transmission from the first radio network node 111 to the second radio network node 121. The network node 110, 111 may further schedule the downlink transmission for said upcoming time slot while taking the first channel state information into account. Expressed somewhat differently, the network node 110, 11 schedules in the upcoming time slot the downlink transmission to radio resources, which are selected based on the first channel state information. These embodiments relate to the example of FIG. 5.

Figure 8:
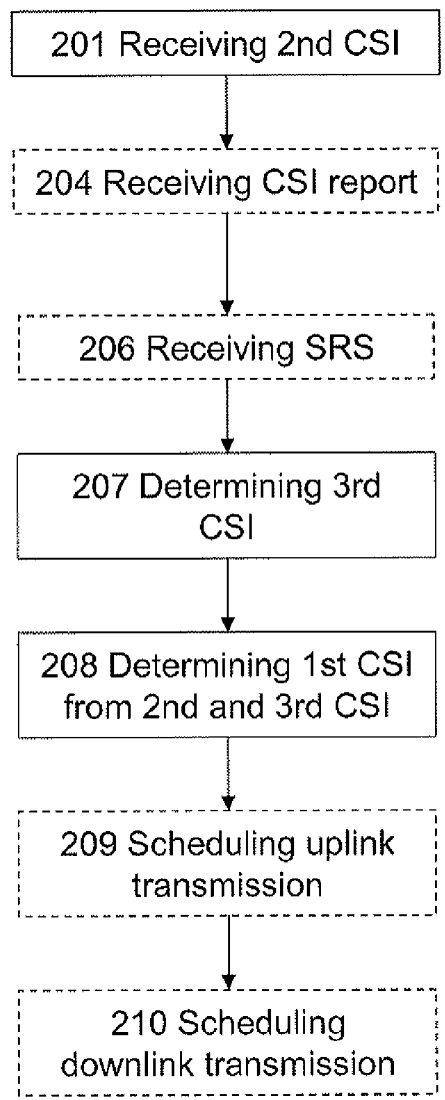
FIG. 8 shows a schematic flow chart of the method of FIG. 7 when seen from the network node.

In FIG. 8, there is shown a schematic flow chart of the method of FIG. 7 when seen from the network node 110, 111. The network node 110, 11 may perform a method for determining first channel state information in an upcoming time slot for use by a first radio network node 111 when determining a set of radio transmission parameters for a transmission between the first radio network node 111 and a second radio network node 121.

In some embodiments of the method, the method is performed by the first radio network node 111 or a further network node 110 controlling the first and/or third radio network node 111, 112.

The following actions, such as steps, may be performed. Notably, in some embodiments of the method the order of the actions may differ from what is indicated below.

Action 201

The network node 110, 111 receives second channel state information for said upcoming time slot.

In some embodiments of the method, the second channel state information comprises fourth channel state information received 203 from the second radio network node 121.

In some embodiments of the method, the fourth channel state information is indicative of channel state for a first frequency range SB1.

In some embodiments of the method, the fourth channel state information is indicative of channel state for a first antenna.

In some embodiments of the method, the second channel state information comprises a report of predicted transmission. The report may be received 202 from a third radio network node 112.

In some embodiments of the method, the report of predicted transmission comprises information about transmission, predicted for the upcoming time slot, from the third radio network node 112 to a fourth radio network node 122, the fourth radio network node 122 is served by the third radio network node 112.

In some embodiments of the method, the report of predicted transmission comprises information about transmission, predicted for the upcoming time slot, from a fourth radio network node 122 to the first radio network node 111, the fourth radio network node 122 is served by the third radio network node 112.

Action 207

The network node 110, 111 determines third channel state information for said upcoming time slot, the second and third channel state information are at least partly non-overlapping with each other.

In some embodiments of the method, the second and third channel state information are at least partly non-overlapping with each other in that the second and third channel state information relates to different frequency ranges, to different antennas and/or to sending of a signal interfering with the transmission and the transmission, respectively.

In some embodiments of the method, the determining 207 of the third channel state information is based on a channel state report received 204 from the second radio network node 121. The channel state report may be CQI report.

In some embodiments of the method, the channel state report comprises information about channel state for a second frequency range SB2. At least a portion of the second frequency range SB2 is non-overlapping with the first frequency range SB1.

In some embodiments of the method, the channel state report comprises information about channel state for a second antenna, the second antenna is different from the first antenna.

In some embodiments of the method, the determining 207 of the third channel state information further is based on the report of predicted transmission.

In some embodiments of the method, the determining 207 of the third channel state information is based on reference symbols, SRS, received 206 from the fourth radio network node 122.

Action 208

The network node 110, 111 determines the first channel state information, for said upcoming time slot, based on the second channel state information and the third channel state information.

Action 209

In some embodiments of the method, the transmission is an uplink transmission from the second radio network node 121 to the first radio network node 111. The network node 110, 111 may further schedule the uplink transmission for said upcoming time slot while taking the first channel state information into account.

Action 210

In some embodiments of the method, the transmission is a downlink transmission from the first radio network node 111 to the second radio network node 121. The network node 110, 111 may further schedule the downlink transmission for said upcoming time slot while taking the first channel state information into account.

Figure 9:
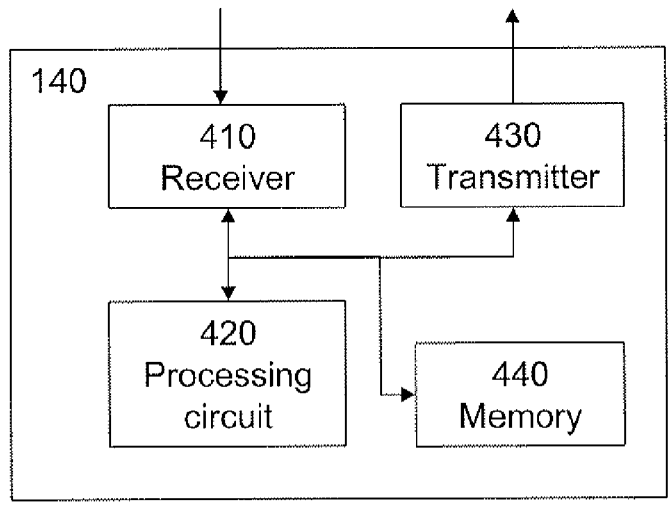
FIG. 9 shows a schematic block diagram of an exemplifying network node configured to perform the method illustrated in FIG. 8.

With reference to FIG. 9, there is shown a schematic block diagram of the network node 110, 111 to perform the actions illustrated with reference to FIG. 8. In the Figure, there is shown a schematic, exemplifying network node 110, 111 for determining first channel state information in an upcoming time slot for determining first channel state information in an upcoming time slot for use by a first radio network node 111 when determining a set of radio transmission parameters for a transmission between the first radio network node 111 and a second radio network node 121.

The network node 110, 111 comprises a receiver 410 configured to receive second channel state information for said upcoming time slot, Moreover, the network node 110, 11 comprises a processing circuit 420 configured to determine third channel state information for said upcoming time slot, the second and third channel state information are at least partly non-overlapping with each other, where in the processing circuit 420 further is configured to determine the first channel state information, for said upcoming time slot, based on the second channel state information and the third channel state information.

In some embodiments of the network node 110, 111, the processing circuit 420 further is configured to determine the third channel state information based on a channel state report received from the second radio network node 121.

In some embodiments of the network node 110, 111, the processing circuit 420 further is configured to determine the third channel state information based on the report of predicted transmission.

In some embodiments of the network node 110, 111, the processing circuit 420 is configured to determine the third channel state information based on reference symbols, SRS, received 206 from the fourth radio network node 122.

The processing circuit 410 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments of the network node 110, 111, the second and third channel state information are at least partly non-overlapping with each other in that the second and third channel state information relates to different frequency ranges, to different antennas and/or to sending of a signal interfering with the transmission and the transmission, respectively.

In some embodiments of the network node 110, 111, the second channel state information comprises fourth channel state information received 203 from the second radio network node 121.

In some embodiments of the network node 110, 111, the fourth channel state information is indicative of channel state for a first frequency range SB1.

In some embodiments of the network node 110, 111, the fourth channel state information is indicative of channel state for a first antenna.

In some embodiments of the network node 110, 111, the channel state report comprises information about channel state for a second frequency range SB2. At least a portion of the second frequency range SB2 is non-overlapping with the first frequency range SB1.

In some embodiments of the network node 110, 111, the channel state report comprises information about channel state for a second antenna, the second antenna is different from the first antenna.

In some embodiments of the network node 110, 111, the second channel state information comprises a report of predicted transmission. The report may be received 202 from a third radio network node 112.

In some embodiments of the network node 110, 111, the report of predicted transmission comprises information about transmission, predicted for the upcoming time slot, from the third radio network node 112 to a fourth radio network node 122, the fourth radio network node 122 is served by the third radio network node 112.

In some embodiments of the network node 110, 111, the transmission is a downlink transmission from the first radio network node 111 to the second radio network node 121, the processing circuit 420 further is configured to schedule the downlink transmission for said upcoming time slot while taking the first channel state information into account.

In some embodiments of the network node 110, 111, the report of predicted transmission comprises information about transmission, predicted for the upcoming time slot, from a fourth radio network node 122 to the first radio network node 111, the fourth radio network node 122 is served by the third radio network node 112.

In some embodiments of the network node 110, 111, the transmission is an uplink transmission from the second radio network node 121 to the first radio network node 111, the processing circuit 420 further is configured to schedule the uplink transmission for said upcoming time slot while taking the first channel state information into account.

In some embodiments of the network node 110, 111, the network node is the first radio network node 111 or a further network node 110 configured to control the first and/or third radio network node 111, 112.

In some embodiments of the network node 110, 111, the network node 110, 111 may further comprise a transmitter 430 configured to transmit the set of radio transmission parameters for the transmission to the second radio network node 121.

In some embodiments of the network node 110, 111, the network node 110, 111 may further comprise a memory 440 for storing software to be executed by, for example, the processing circuit. The software may comprise instructions to enable the processing circuit to perform the method in the radio network node 110 as described above in conjunction with FIG. 3. The memory 440 may be a hard disk, a magnetic storage medium, a portable computer diskette or disc, Flash memory, random access memory (RAM), or the like. Furthermore, the memory may be an internal register memory of a processor.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for determining first channel state information predicted for an upcoming time slot for use by a first radio network node when determining a set of radio transmission parameters for a transmission between the first radio network node and a second radio network node comprising:
    receiving second channel state information for said upcoming time slot from a third radio network node, wherein the second channel state information comprises a report of predicted transmission, wherein the report of predicted transmission comprises information about transmission, predicted for the upcoming time slot, from/to the third radio network node to/from a fourth radio network node, wherein the fourth radio network node is served by the third radio network node;
    determining third channel state information predicted for said upcoming time slot, wherein the second and third channel state information are at least partly non-overlapping with each other in that the second and third channel state information relates to sending of a signal interfering with the transmission and the transmission, respectively; and
    determining the first channel state information, predicted for said upcoming time slot, based on the second channel state information and the third channel state information by combining the second and third channel state information.

2. The method according to claim 1, wherein the determining of the third channel state information is based on a channel state report received from the second radio network node.

3. The method according to claim 1, wherein the transmission is a downlink transmission from the first radio network node to the second radio network node further comprising:
    scheduling the downlink transmission for said upcoming time slot while taking the first channel state information into account.

4. The method according to claim 1, wherein the determining of the third channel state information is based on reference symbols, (SRS), received from the fourth radio network node.

5. The method according to claim 1, wherein the transmission is an uplink transmission from the second radio network node to the first radio network node, and wherein the method further comprises:
    scheduling the uplink transmission for said upcoming time slot while taking the first channel state information into account.

6. The method according to claim 1, wherein the method is performed by the first radio network node or a further network node controlling the first and/or third radio network node.

7. A network node for determining first channel state information predicted for an upcoming time slot for use by a first radio network node when determining a set of radio transmission parameters for a transmission between the first radio network node and a second radio network node comprising:
    a receiver configured to receive second channel state information predicted for said upcoming time slot from a third radio network node, wherein the second channel state information comprises a report of predicted transmission, wherein the report of predicted transmission comprises information about transmission, predicted for the upcoming time slot, from/to the third radio network node to/from a fourth radio network node, wherein the fourth radio network node is served by the third radio network node, and
    a processing circuit configured to determine third channel state information predicted for said upcoming time slot, wherein the second and third channel state information are at least partly non-overlapping with each other in that the second and third channel state information relates to sending of a signal interfering with the transmission and the transmission, respectively, wherein the processing circuit is further configured to determine the first channel state information, predicted for said upcoming time slot, based on the second channel state information and the third channel state information by combining the second and third channel state information.

8. The network node according to claim 7, wherein the processing circuit is further configured to determine the third channel state information based on a channel state report received from the second radio network node.

9. The network node according to claim 7, wherein the transmission is a downlink transmission from the first radio network node to the second radio network node, wherein the processing circuit is further configured to schedule the downlink transmission for said upcoming time slot while taking the first channel state information into account.

10. The network node according to claim 7, wherein the processing circuit is further configured to determine the third channel state information based on reference symbols, (SRS), received from the fourth radio network node.

11. The network node according to claim 7, wherein the transmission is an uplink transmission from the second radio network node to the first radio network node, and wherein the processing circuit is further configured to schedule the uplink transmission for said upcoming time slot while taking the first channel state information into account.

12. The network node according to claim 7, wherein the network node is the first radio network node or a further network node configured to control the first and/or third radio network node.

* * * * *

UNITED STATES PATENT AND TRADEMARK OFFICE
CERTIFICATE OF CORRECTION

PATENT NO. : 9,225,502 B2  
APPLICATION NO. : 14/009075  
DATED : December 29, 2015  
INVENTOR(S) : Asplund et al.

Page 1 of 1

It is certified that error appears in the above-identified patent and that said Letters Patent is hereby corrected as shown below:

On The Title Page, Item (75), under "Inventors", in Column 1, Line 4, delete "Lulea (SE)" and insert -- Luleå (SE) --, therefor.

In The Specification

In Column 8, Line 32, delete "$h_l(t_3)$" and insert -- $h_1(t_3)$ --, therefor.

In Column 8, Line 38, delete "$h_l(t_3)$" and insert -- $h_1(t_3)$ --, therefor.

In Column 8, Line 48, delete "$h_l(t_3)$," and insert -- $h_1(t_3)$, --, therefor.

Signed and Sealed this  
Tenth Day of May, 2016

Michelle K. Lee  
*Director of the United States Patent and Trademark Office*